United States Patent [19]

Angle et al.

[11] Patent Number: 5,541,920
[45] Date of Patent: Jul. 30, 1996

[54] METHOD AND APPARATUS FOR A DELAYED REPLACE MECHANISM FOR A STREAMING PACKET MODIFICATION ENGINE

[75] Inventors: Richard Angle, Wellesley; Geoffrey Ladwig, Worcester, both of Mass.

[73] Assignee: Bay Networks, Inc., Billerica, Mass.

[21] Appl. No.: 490,983

[22] Filed: Jun. 15, 1995

[51] Int. Cl.⁶ .................................................. H04L 12/56
[52] U.S. Cl. ........................................ 370/61; 370/94.1
[58] Field of Search ................................. 380/9, 42, 49; 370/60, 61, 85.13, 94.1, 99, 108; 395/200.18, 874

[56] References Cited

U.S. PATENT DOCUMENTS 5,070,528  12/1991  Hawe et al. ................................. 380/48
5,457,683  10/1995  Robins ...................................... 370/94.1
5,465,331  11/1995  Yang et al. ................................... 370/61

*Primary Examiner*—Benedict V. Safourek
*Attorney, Agent, or Firm*—Blakely, Sokoloff, Taylor & Zafman

[57] ABSTRACT

A delayed replace mechanism for a streaming packet modification engine. The delayed replace mechanism allows for packet streaming where embedded fields within a data packet may be modified dependent upon fields following them within the data packet. Data to be forwarded is buffered through a data FIFO while marking fields that are to be replaced. Calculated replacement fields are stored in a replacement FIFO to be overwritten upon transmission from the packet streaming mechanism.

17 Claims, 4 Drawing Sheets

Conventional Organization

Streaming
Modify Engine

Conceptual Streaming Organization

METHOD AND APPARATUS FOR A DELAYED REPLACE MECHANISM FOR A STREAMING PACKET MODIFICATION ENGINE

BACKGROUND OF THE INVENTION

1. Field of the Invention

The present invention relates to data packet routing in data communication networks. More particularly, the present invention relates to a method and apparatus of streaming data packet routing to increase data packet throughput.

2. Art Background

Computer networks are implemented for the exchange information from one location to another. The information may be data exchanged between users of the computer network, or data propagated from one user to a peripheral device such as a printer or a remote data storage location. In recent years, networking systems have spread worldwide, increasing the efficiency of users working habits by increasing the volume of information that can be exchanged almost instantaneously from one location to another. The effect has been revolutionary. Today, even person communications and document delivery are handled via electronic mail where, in the past, other means of communicating would have been required.

The proliferation of computer networks has necessitated the development of high speed and complex communications devices. One such device is the data packet router. A packet router is responsible for providing network layer functionality in local and wide area networks. This involves receiving a packet from one network, determining where the packet should be forwarded to, modifying the packet appropriately and sending it to its proper next destination. FIG. 1(a) illustrates a conventional mechanism for a packet routing engine. The packet is received and is stored into a conventional memory array 10. The contents of the data packet stored in memory device 10 are then modified in memory 10 by the modify engine 20. The modified data packet may then be forwarded by reading the data out of memory device 10. This conventional method suffers an undesirable delay due to the load and store times necessary for accessing the memory 10.

Another approach to packet routing is to modify the packet on the fly as it streams towards its destination. Vector processors, such as Cray Computers, can broadly be considered "streaming modify engines", but have not been strictly applied to data packet processing. A conceptual streaming organization is illustrated in FIG. 1(b) which illustrates a streaming packet modification engine 30 which would eliminate the load/store delay that is introduced when packets are modified in a memory. The streaming modification pipeline adds some latency to the process but adds no per packet delay which would otherwise reduce throughput. A problem that would be encountered when applying a streaming modification engine to data packet processing occurs when data in a packet to be modified is dependent on data that follows it in the packet. One example of this is the checksum in the header of an IP packet. As will be described more fully below, the checksum in some protocols may be calculated based on fields both preceding and following the checksum field in the data packet. Thus, using the streaming modify engine architecture of FIG. 1(b) for some data packets would be impossible because the checksum field cannot be forwarded to its destination until the fields following it have been examined to calculate a new checksum field.

It would be desirable, and is therefore an object of the present invention, to achieve the advantages of the packet streaming modification engine implementation for use with packets that include fields that need to be modified on the fly which are dependent on fields that may follow them in the packet.

SUMMARY OF THE INVENTION

From the forgoing, it can be appreciated that it is desirable to implement a packet streaming modification technique for data packets which include fields that may need to be modified based on the packet contents following the field to be modified. To do so will eliminate the load/store delay of conventional memory data packet routing. It is accordingly an object of the present invention to provide a packet streaming modify engine adapted for data packets such as those described.

This and other objects of the present invention are provided by a delayed replace mechanism utilized in a packet streaming engine. When a data field, such as the checksum field in an IP packet, is dependent upon data that follows it in the packet, a place holder with a tag is inserted in its place as data streams through the packet engine. As the data exits the engine, it is buffered in a data FIFO with the old data or dummy data in the field that will eventually be replaced with a newly calculated field. The marked field is stored with an identifier such as a tag. The data packet modify engine continues computation of the new checksum, or other field to be modified, which will eventually replace the data in the data FIFO as the remaining data fields continue to stream through the packet modify engine. The subsequent fields are also stored in the data FIFO following the place marker data. When the packet modify engine completes computation of the replacement field, the result is buffered in a replace FIFO.

A FIFO control logic reads the data out of the data FIFO and forwards it to its destination. If the FIFO control logic encounters the place holder identifier, it attempts to retrieve data from the replace FIFO. If the replace data is not yet available, the FIFO control logic delays until the replace data is ready. When the replace data is available, the FIFO control logic forces the data in the replace FIFO to overwrite the place holder data from the data FIFO while continuing transmission of the rest of the packet. Thus, the data may be processed as though it were packet streaming, without having to delay for load and store requests to a conventional memory array.

In accordance with another aspect of the present invention, the above packet streaming modification may be extended. In this extension, rather than a FIFO for the replace data, a fast memory such as a static random access memory (SRAM) device may be implemented. By using a replace storage device with multiple entries, it is possible to provide for data packets in which multiple fields in random order may need to recalculated on the fly that are dependent on subsequent data in the data packet. Further, this allows packet fields to have their locations exchanged in the output packet in accordance with alternative data packet protocols. In accordance with this embodiment of the present invention, the data storage device would also store, in addition to a place marker and an identification, the address in a the replace SRAM where the replace data is stored.

BRIEF DESCRIPTION OF THE DRAWINGS

The objects, features and advantages of the present invention will become apparent to one of ordinary skill in the art in light of the following detailed description in which.

DETAILED DESCRIPTION

A method and apparatus are described for a delayed replace mechanism for data packet routing using a streaming packet modification engine. Throughout this detailed description, numerous references are made to specific details such as particular packet protocols and buffer types. However, it will be appreciated by one of ordinary skill in the art that the present invention may be practiced without such specific details and may in fact be applied to numerous applications where data streaming is desirable. In addition, many well-known elements, devices, process steps and the like are not set forth in detail in order to avoid obscuring the present invention.

Figure 2:
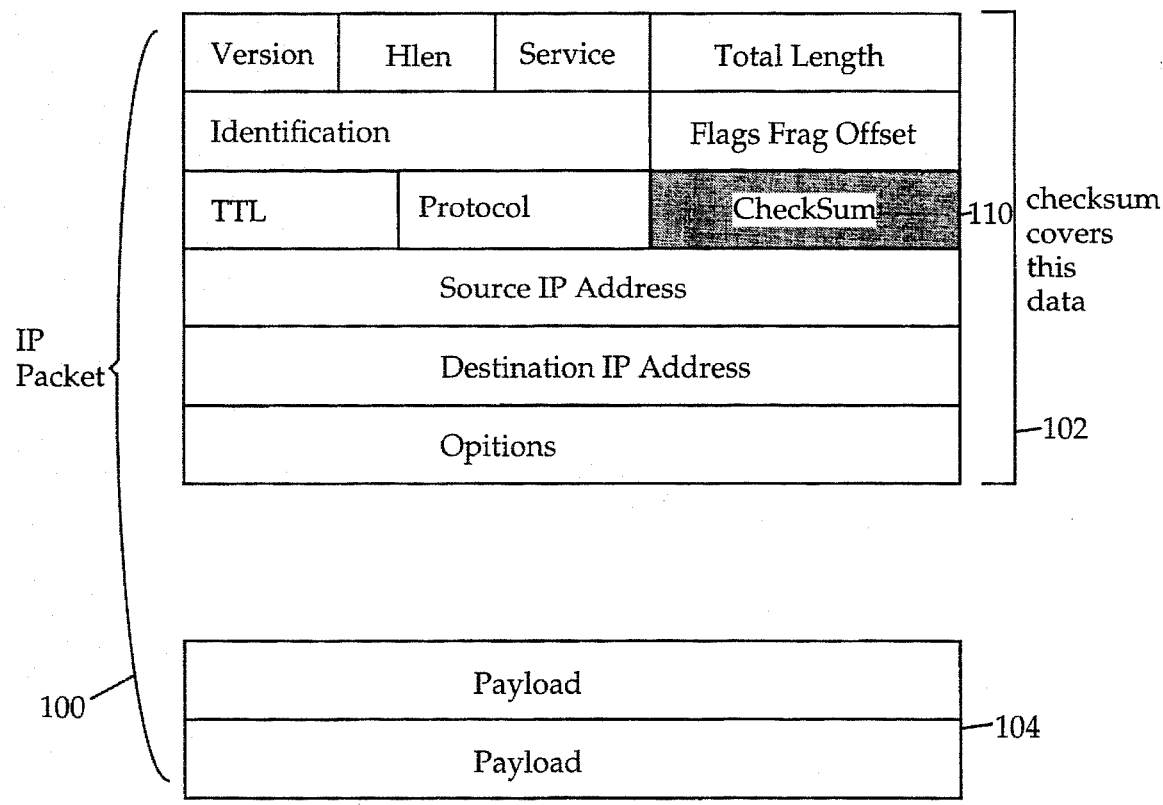
FIG. 2 represents an exemplary data packet for which the contents of one embedded field within the packet is dependent upon fields both preceding and following it within the data packet.

FIG. 2 illustrates the data packet organization for a data packet format constructed in accordance with the internet protocol (IP). The IP packet 100 is shown with its two major constituents, a header section 102 and a data payload section 104. The header section 102 of the IP packet 100 includes a Checksum field 110 which is calculated based on the entire contents of the header section 102. As the data packet is routed from point to point between its origin and ultimate destination, various fields in the header may vary. For example, the TTL (time to live) field is decremented at every step by every router that forwards the packet. Other fields may change such as the FRAG offset field and possibly the length fields. Of particular importance here are fields like the Checksum field which may change at each hop due to changes in the entire data packet header. Note that the Checksum field is embedded within the header with subsequent data being utilized in determining the value of the Checksum field. Note also that the address fields may change based on the value of fields in the options portion of the header. It is these fields within the header that may change based on values following them within the packet that are of concern to the present invention. See "Internetworking with TCP/IP", Volume I, Prentice Hall, by Douglas E. Comer for a description of calculating a Checksum.

Figure 1A:
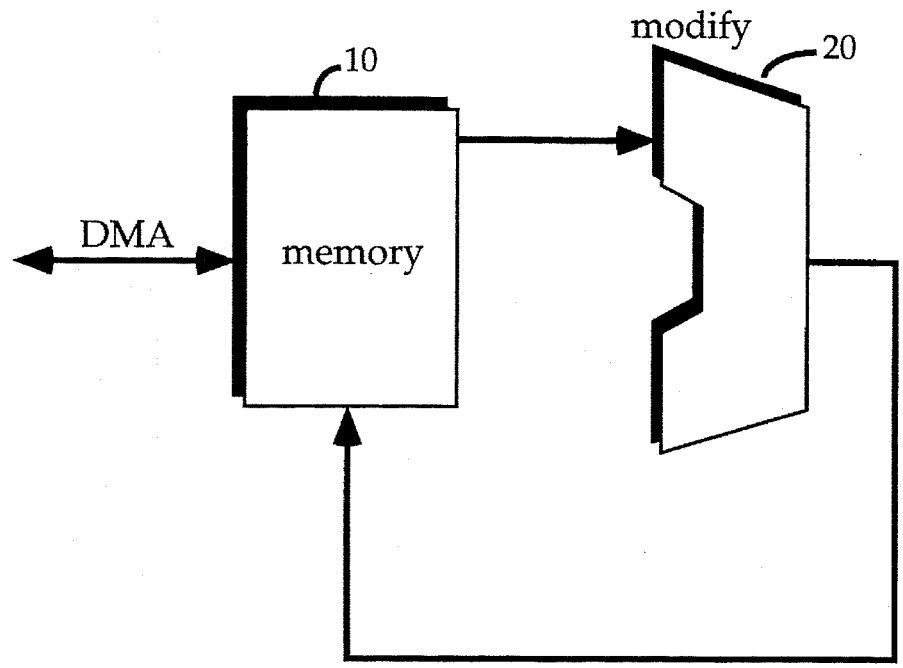
FIGS. 1(a) and 1(b) illustrate a prior art packet routing technique and a conceptual packet streaming organization, respectively.
Figure 1B:
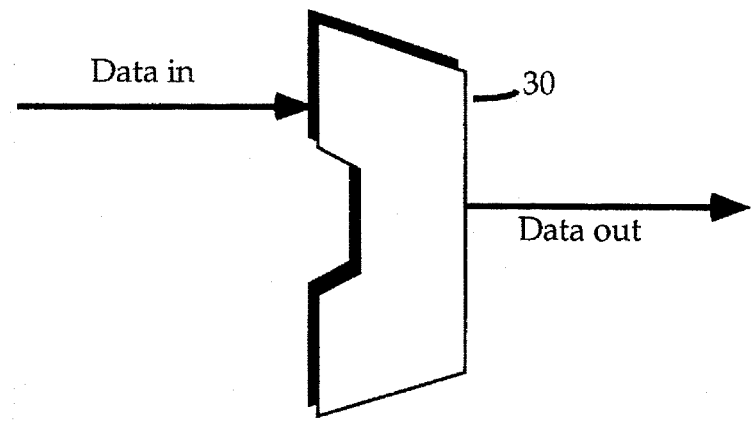

In accordance with routing an IP data packet under the conventional architecture as illustrated in prior art FIG. 1(a), a packet would be received by a router and stored in the memory device 10. The contents of the Checksum field would be calculated based on the entire contents of the header section 102 and modified in place in the memory 10 at the direction of the modify engine 20. The packet would then be retrieved from the memory 10 and forwarded to the next destination. The conceptual packet streaming organization illustrated in FIG. 1(b) would be incapable of handling a conventional IP data packet because the contents of the Checksum field 110 and other fields are dependent upon fields following it within the header section 102. Thus, the present invention is provided to allow for a packet streaming technique suitable even for data packets that adhere to a protocol in which embedded fields may be dependent upon fields following them within the packet.

Figure 3:
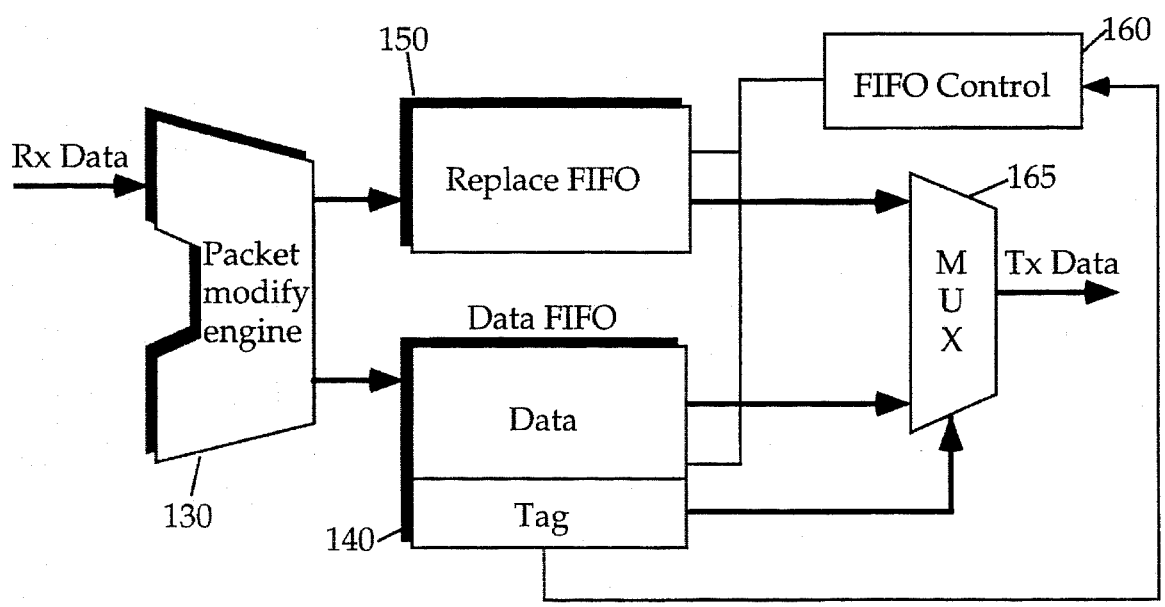
FIG. 3 illustrates one embodiment of the present invention for a streaming packet modification engine which allows for the modification of data packets which include a field that is dependent upon fields following it within the data packet.

Referring now to FIG. 3 there is shown one embodiment of the delayed replace mechanism of the present invention. In this embodiment, streaming data packets are received through the packet modify engine 130. The packet modify engine 130 implemented for receiving IP data packets will include logic such that when the Checksum field is reached, certain procedures are undertaken. In general, as a data packet streams into the packet modify engine, the output is temporarily buffered in the data FIFO 140. However, when the Checksum field for an IP data packet reaches the packet modify engine, the data written into the data FIFO 140 may include dummy data or the old Checksum value. In addition, an identifier or tag is stored in the data FIFO 140 indicating the presence of a Checksum field or other field to be overwritten upon transmission.

When the packet modify engine 130 of the illustrated embodiment of FIG. 3 begins receiving a data packet, it begins the calculations necessary for calculating a new Checksum field. These calculations continue until the entire header portion 102 of the IP data packet has been received. The packet modify engine then completes calculating the new Checksum and stores the result in a replace FIFO 150.

Data packets are streamed out of the apparatus under the direction of the FIFO control logic 160. The FIFO control logic 160 instructs the data FIFO 140 to begin outputting the data packet to be forwarded through multiplexing logic 165. The tagged field within the data FIFO that indicates the Checksum field provides a control signal to both the multiplexing logic 165 and the FIFO control logic 160 instructing those units that the field to be replaced is next to be propagated from the data FIFO. In response to this control signal, the FIFO control logic 160 instructs the replace FIFO 150 to provide the result data through the multiplexing logic 165 into the reserved space of the data packet being streamed out of the data FIFO 140. If the FIFO control logic 160 determines that the replace data is not yet available, it delays the transmission until the data is present in the replace FIFO 150. When the replace data is available, it overwrites the place holder within the data in the data FIFO with the value from the replace FIFO and continues with streaming the data out of the apparatus.

The mechanism of FIG. 3 thus allows for data streaming of data packets in which a field may be modified based on data following it within the same data packet. This eliminates the need for load and store accesses to a conventional memory array such as in the prior art.

Figure 4:
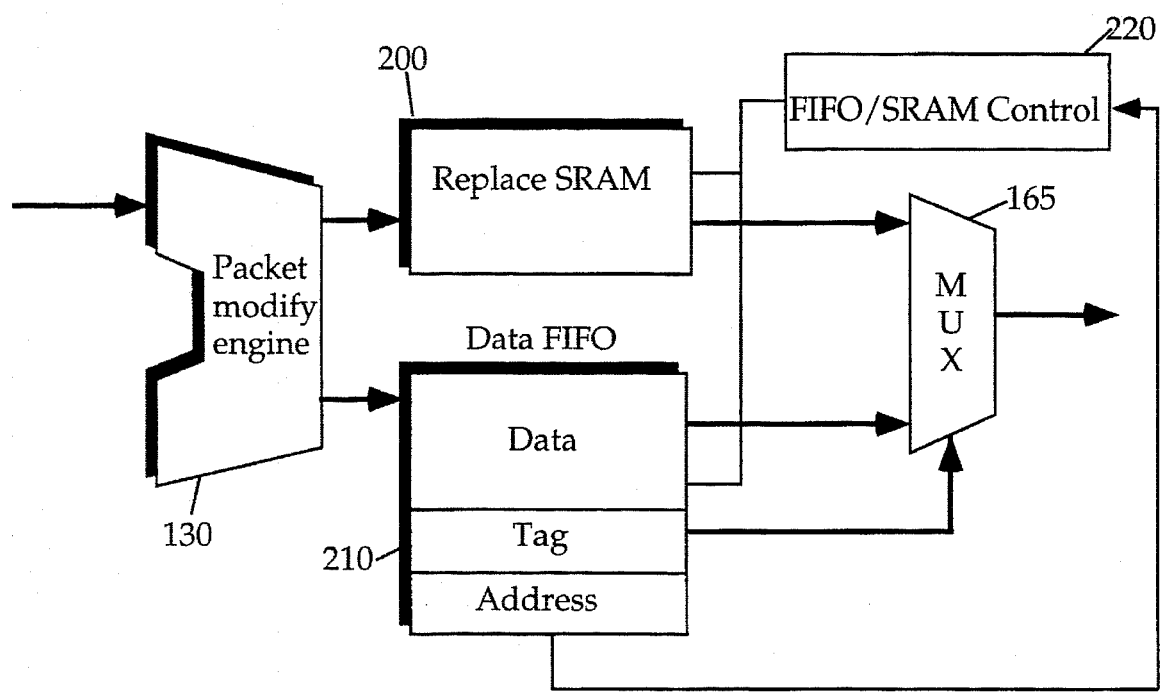
FIG. 4 illustrates an alternative embodiment of the present invention for packet streaming where multiple fields in random order may be modified.

FIG. 4 illustrates an alternative embodiment of the present invention. In this embodiment, it is conceived that multiple fields in random or non-sequential order in a streaming data packet may need to be replaced or swapped. And this instance, the replace FIFO 150 is omitted in favor of a replace static random access memory (SRAM device) 200. The data FIFO 140 is omitted in favor of data FIFO 210 which in addition to storing data and tags for the fields to be replaced, also maintains an address field for identifying an address within the replace SRAM 200 for populating the reserved spaces of data being streamed into the data FIFO 210. The FIFO/SRAM control logic 220 of FIG. 4 responds to a control signal from the tag fields in the data FIFO and reads an appropriate entry in the replace SRAM 200 for overwriting the reserved space in the data upon outputting through the multiplexing logic 165.

This alternative embodiment illustrated in FIG. 4 is suitable for streaming data packets in which more then one field needs to be recalculated for replacement upon output through the multiplexing logic 165. In addition, through appropriate configuration of the FIFO/SRAM control logic 220, the alternative embodiment of FIG. 4 can be used to swap the position of fields streamed out of the engine. In this regard, the fields to be swapped would each be stored in the replace SRAM 200 with their addresses and tags marked in the data FIFO 210. A similar mechanism for controlling the FIFO/SRAM control logic would then be implemented for controlling the output of the replace SRAM to write the two fields into their swapped positions upon output. Those of ordinary skill in the art will conceive alternative uses for such an embodiment.

Although the present invention has been described in terms of data packet routing it should be understood that the delayed replace mechanism of the present invention may find application in other areas of data processing, such as in a vector microprocessor wherein it is desirable to modify pieces of data on the fly wherein the contents of one piece of data may be dependent upon a subsequent piece of data. Accordingly, the scope of the present invention should only be determined in light of the claims which follow.

What is claimed is:

1. A streaming data modification apparatus comprising:
    a packet modification engine coupled to receive a data packet wherein said data packet includes a plurality of data fields including an embedded field to be replaced with a modified field calculated based on data fields preceding and following said embedded field within said data packet;
    a data buffer coupled to receive said data packet from said packet modification engine, said packet modification engine marking a space in said data buffer for said modified field to replace said embedded field;
    a replace buffer coupled to receive said modified field from said packet modification engine; and
    packet transmission logic coupled to said data buffer and said replace buffer for transmitting said data packet, said transmission logic replacing said embedded field in said data buffer with said modified field from said replace buffer upon transmission.

2. The streaming data modification apparatus of claim 1 wherein said embedded field comprises a received checksum field and said modified field comprises a transmission checksum.

3. The streaming data modification apparatus of claim 1 wherein said data buffer and said replace buffer each respectively comprise a first in/first out (FIFO) buffer.

4. The streaming data modification apparatus of claim 3 wherein said packet transmission logic comprises multiplexing circuitry coupled for transmitting said data packet and said modified field, said multiplexing circuitry inserting said modified field in place of said embedded field.

5. The streaming data modification apparatus of claim 4 wherein said data buffer includes storage for an identifier for said embedded field, said identifier being provided to said multiplexing circuitry as a control signal to trigger transmission of said modified field.

6. The streaming data modification apparatus of claim 5 wherein said data packet comprises an internet protocol (IP) data packet having a header, said embedded field being a checksum determined by said header.

7. The streaming data modification apparatus of claim 1 wherein said data packet includes a plurality of embedded fields to be replaced by a plurality of modified fields in random order, said replace buffer comprising an array of static random access memory (SRAM) for storing said plurality of modified fields.

8. The streaming data modification apparatus of claim 7 wherein said data buffer includes storage for identifiers identifying said embedded fields and storage for addresses in said SRAM corresponding to said modified fields.

9. A method of data packet streaming comprising the steps of:
    receiving a data packet, wherein said data packet includes a plurality of data fields including an embedded field to be replaced with a modified field;
    buffering said data packet in a data buffer;
    marking said embedded field in said data buffer;
    generating said modified field;
    transmitting said data packet; and
    upon transmitting said data packet, replacing said embedded field with said modified field.

10. The method according to claim 9 further comprising the step of after said generating step, buffering said modified field in a replace buffer.

11. The method according to claim 10 wherein said marking step comprises the step of storing tag information in said data buffer indicating the presence of said embedded field.

12. The method according to claim 11 wherein said replacing step includes the step of providing said tag information to control circuitry for selecting said modified field from said replace buffer.

13. The method according to claim 12 wherein said transmitting step comprises the step of streaming said data packet out through multiplexing circuitry, and wherein said replacing step comprises the steps of said multiplexing circuitry responding to said tag information and selecting said modified field to overwrite said embedded field of said data packet.

14. The method according to claim 9 wherein said data packet includes a plurality embedded fields to be replaced by a plurality of corresponding modified fields in random order, said method further comprising the steps of:
    buffering said plurality of modified fields in a fast memory array wherein each of said modified fields has an address in said memory array; and
    storing in said data buffer said addresses for said plurality of modified fields corresponding to said embedded fields to be replaced.

15. A apparatus for data packet streaming comprising:
    means for receiving a data packet, wherein said data packet includes a plurality of data fields including an embedded field to be replaced with a modified field;
    means for buffering said data packet;
    means for marking said embedded field in said means for buffering;
    means for calculating said modified field;
    means for transmitting said data packet; and
    means for, upon transmitting said data packet, replacing said embedded field with said modified field.

16. The apparatus of claim 15 further comprising means for buffering said modified field.

17. The apparatus of claim 16 further comprising means for tagging said embedded field in said means for buffering said data packet.

* * * * *